May 21, 1968 R. J. SARGENT 3,384,413
FLEXIBLE COVER ASSEMBLY
Filed Feb. 13, 1967 3 Sheets-Sheet 2

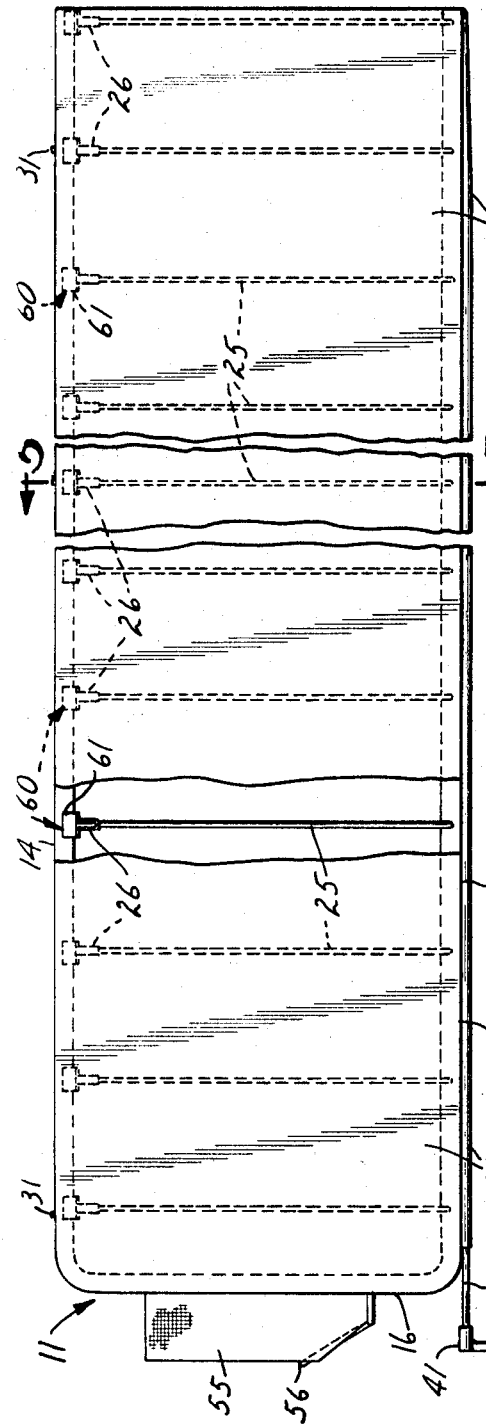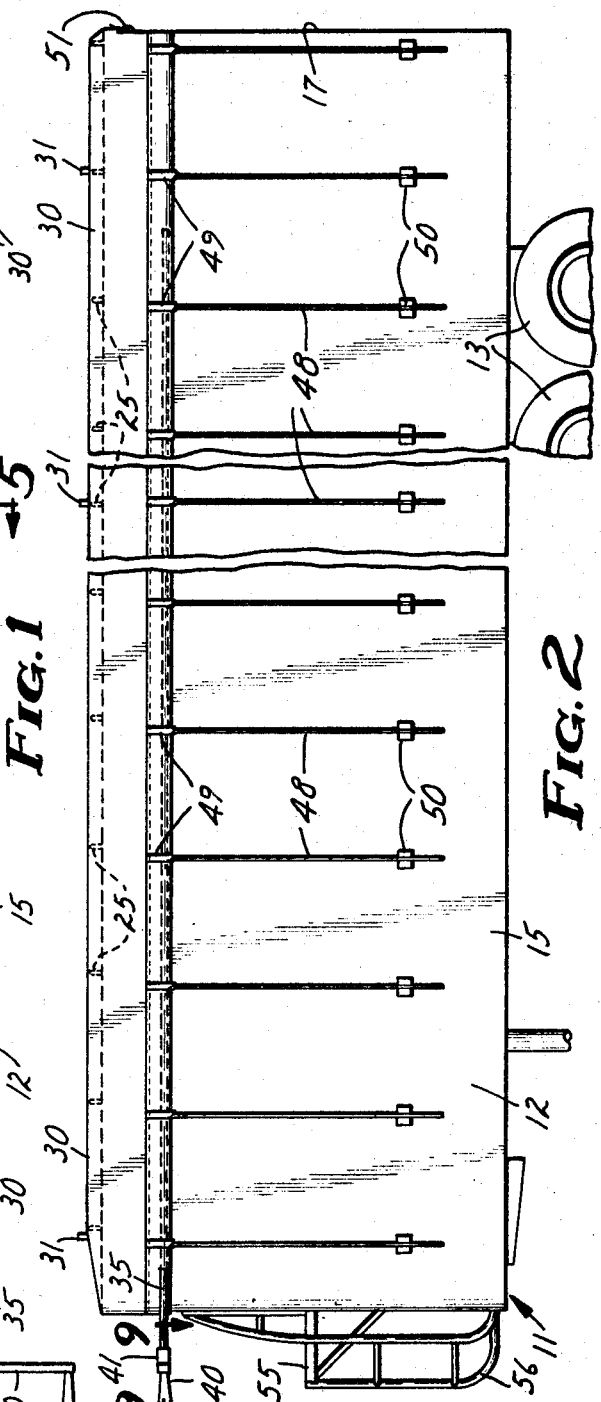

INVENTOR.
ROBERT J. SARGENT
BY Merchant & Gould
ATTORNEYS

May 21, 1968   R. J. SARGENT   3,384,413
FLEXIBLE COVER ASSEMBLY
Filed Feb. 13, 1967   3 Sheets-Sheet 3

INVENTOR.
ROBERT J. SARGENT
BY Merchant & Gould
ATTORNEYS

United States Patent Office 3,384,413
Patented May 21, 1968

3,384,413
FLEXIBLE COVER ASSEMBLY
Robert J. Sargent, 1947 W. County Road C,
St. Paul, Minn. 55113
Filed Feb. 13, 1967, Ser. No. 615,509
3 Claims. (Cl. 296—98)

ABSTRACT OF THE DISCLOSURE

A flexible cover assembly for use with an open topped semi-trailer having removable bows extending transversely thereacross, and including means for rolling the flexible cover into a generally cylindrical rolled up position at the top of the semi-trailer adjacent one side thereof. A plurality of small frames are provided which are adapted to be engaged in one vertical wall of a semi-trailer in longitudinally spaced relationship to each other, and to receive the ends of the bows therein so that there is ample room to store the flexible cover in the rolled position in overlying relation thereto without the flexible cover protruding past the side of the trailer but still allowing the bows to be removed if desired.

Background of the invention

Field of the invention.—This invention pertains to a new and improved flexible cover assembly for semi-trailers and the like, and more particularly to apparatus for covering an open topped semi-trailer which may be conveniently handled by one man, and which can be stored at the top of the trailer without hampering the operation of the trailer or increasing the over-all dimensions thereof.

In the trucking industry, open topped semi-trailers are utilized to transport bulk loads and excessively large equipment which may be loaded from the top by means of a crane or the like. To load and unload this type of material, the top must be removable and a flexible cover, such as canvas or the like, is generally utilized for this purpose. Removable steel bows are engaged in spaced apart openings in the top of the side walls to aid in maintaining the side walls vertical and to help maintain the flexible cover in position over the semi-trailer.

In the industry the top of the semi-trailer is covered by a generally rectangular-shaped canvas or the like, the edges of which are fastened to the outer surfaces of the upright walls of the semi-trailer, which will be referred to as the cargo box in this specification. In general, the type of semi-trailer discussed in this specification is the type having a cargo box with the maximum outside dimensions allowed by local, State and Federal laws. Because of the size of the cargo box it is extremely difficult for a single man to stretch a flexible cover over the top thereof and fasten the cover by the edges to the cargo box.

Description of the prior art.—Some devices have been patented wherein a canvas can be slid longitudinally the length of the cargo box and stored in an accordion-like position at the front thereof, or stretched the length of the box to serve as a cover. These devices are not satisfactory because it still requires a great amount of effort for a single man to slide the flexible cover longitudinally the length of the cargo box. Also, in many instances these devices do not adequately cover the cargo box. Some devices have been patented wherein a flexible cover is rolled transversely the width of the cargo box and stored in a rolled position against the outer surface of one of the side walls. These devices are unsatisfactory because they increase the width of the cargo box and, therefore, are illegal when the cargo box already has the maximum allowable outer dimensions.

Summary of the invention

In the present invention a generally rectangular flexible cover is fixedly attached along one longitudinal edge to the outer surface of one vertical side wall of the cargo box. The opposite edge has a cylinder attached thereto for rolling the flexible cover therearound in a transverse direction. A crank is engageable in one end of the cylinder so that a single man can rotate the cylinder from one end, and roll it from one edge of the cargo box to the other thereby forming the flexible cover into a roll. The cargo box is provided with a plurality of upwardly extending members along the upper edge of the one side wall to which the flexible cover is fixedly attached. Also, the bow receiving holes in the upper surface of the one side wall are moved inwardly, by means of a plurality of especially constructed frame members or during construction of the cargo box, so that there is sufficient distance between the end of the bows engaged in the holes and the upwardly extending means to store the rolled flexible cover. Therefore, the rolled flexible cover is stored at the top of the cargo box rather than on the side thereof, and it is much easier to handle. Also, because the rolled flexible cover is stored at the top of the cargo box it does not increase the outer dimensions of the cargo box and, therefore, the present invention can be utilized on cargo boxes having the maximum allowable outer dimensions.

It is an object of this invention to provide a new and improved flexible cover assembly for an open topped semi-trailer.

It is a further object of this invention to provide a flexible cover assembly for an open topped semi-trailer which may be utilized on cargo boxes having the maximum allowable outer dimensions.

It is a further object of this invention to provide a flexible cover assembly for an open topped semi-trailer which may be rolled into the storage position or unrolled and fastened over the cargo box by a single operator.

These and other objects of this invention will become apparent to those skilled in the art upon consideration of the accompanying specification, claims, and drawings.

Brief description of the drawings

Referring to the drawings, wherein like characters indicate like parts throughout the figures:

FIG. 1 is a view in top plan of a semi-trailer having the present invention attached thereto and fastened in the unrolled position, some parts broken away;

FIG. 2 is a view in side elevation of the apparatus illustrated in FIG. 1, some parts broken away;

*Description of the preferred embodiment*

Figure 3:
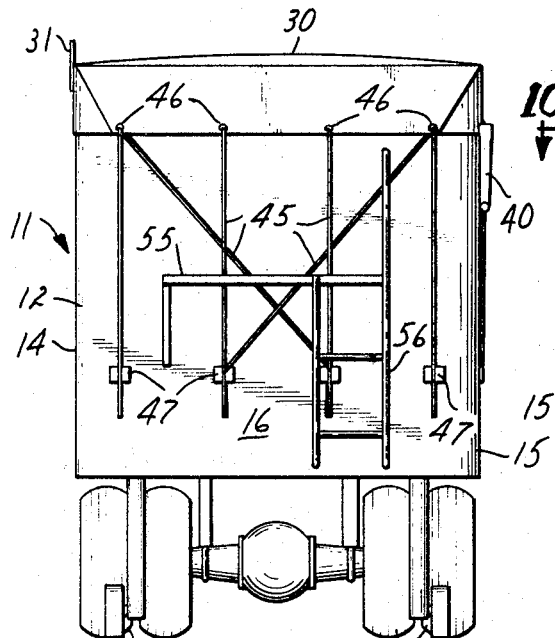
FIG. 3 is a view in end elevation as seen from the front of the semi-trailer illustrated in FIG. 1.
Figure 4:
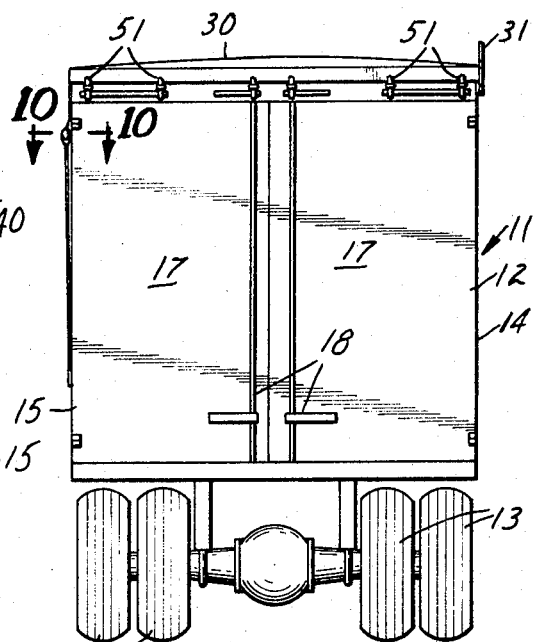
FIG. 4 is a view in end elevation as seen from the rear of the semi-trailer illustrated in FIG. 1.

In the figures, the numeral 11 generally designates a semi-trailer including a cargo box 12 with wheels 13 attached thereunder for transporting the semi-trailer on highways or the like. The cargo box 12 has a vertical curb side wall 14, a street side wall 15, and a front wall 16. The rear of the cargo box 12 is enclosed by a pair of doors 17 hingedly attached to the curb side wall 14 and the street side wall 15. The pair of doors 17 are cooperatively closed together in the usual manner by the handle and bar arrangement 18. An inwardly extending lip 20 is formed adjacent the upper edge of the curb side wall 14, and an inwardly extending lip 21 is formed adjacent the upper edge of the street side wall 15. The lips 20 and 21 are formed as a part of the cargo box 12 and have a plurality of longitudinally spaced apart vertical openings having vertical sleeves 22 and 23, respectively, therein. A plurality of bows 25 are adapted to extend transversely across the cargo box 12, and each bow 25 has one end adapted to be engaged in a sleeve 23 in lip 21 while the opposite end is adapted to be engaged in a sleeve 22 in lip 20. The bows 25 are parallel and longitudinally spaced apart the length of the cargo box 12 to maintain the curb side wall 14 and the street side wall 15 approximately parallel even though a bulk load is being carried therein. In the present embodiment, each of the bows 25 is constructed with a turnbuckle 26 adjacent one end thereof so that the length of each of the bows 25 is adjustable. It should be understood that the bows 25 can be constructed of a single piece of material of a predetermined length if it is desired.

A generally rectangular flexible cover 30 is fixedly attached adjacent one edge to the outer surface of the curb side wall 14. The flexible cover 30 overlaps a portion of the outer surface of the curb side wall 14 adjacent the upper edge, and a plurality of bars 31 are positioned vertically in a longitudinally spaced apart relationship along the upper edge of the curb side wall 14 so that the lower portion thereof overlies the flexible cover 30. The bars 31 and the cover 30 are held fixedly in place by some convenient means such as bolts 32. The bars 31 extend upwardly above the upper edge of the curb side wall 14 a substantial distance for reasons which will be explained presently. The flexible cover 30 is formed so that it covers the entire top of the cargo box 12 and overlies substantial portions of the street side wall 15 and the front wall 16.

Figure 9:
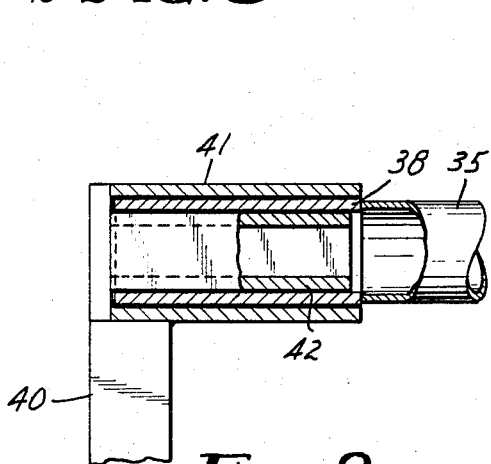
FIG. 9 is an enlarged sectional view as seen from the line 9—9 in FIG. 2.

An elongated cylinder 35 is placed adjacent the edge of the flexible cover 30 overlying the outer surface of the street side wall 15, and the flexible cover 30 is folded over the cylinder 35 to form a loop of material therearound. The loop of material surrounding the cylinder 35 is closed by sewing or the like at 36. The cylinder 35, which may be formed from any suitable material, is constructed from a hollow aluminum tube in the present embodiment to obtain the desired weight and strength. A plurality of bolts or elongated rivets 37 fixedly attach the cylinder 35 within the loop of the flexible material 30 to prevent relative rotation therebetween. The front end of the cylinder 35 has a portion 38 fixedly attached thereto, which portion 38 has a hollow square cross-section. A crank, generally designated 40, is constructed with two portions 41 and 42 having hollow square cross-sections and concentrically mounted in a radially spaced apart position so that the portion 38 of the cylinder 35 fits snugly therebetween in a concentric relationship, as illustrated in FIG. 9. Thus, the crank 40 positively grips the portion 38 of the cylinder 35, and rotation of the crank 40 rotates the entire cylinder 35 thereby rolling the flexible member 30 therearound. Since the flexible cover 30 is fixedly attached to the upper surface of the curb side wall 14, as the cylinder 35 is rotated it moves up the outer surface of the street side wall 15 and across the top of the cargo box 12 to the upper edge of the curb side wall 14 against the bars 31, as illustrated in dotted lines in FIG. 5.

Figure 10:
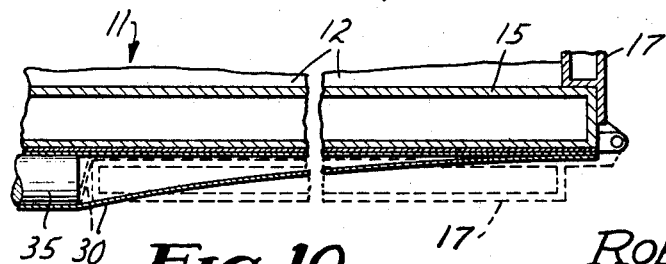
FIG. 10 is an enlarged sectional view as seen from the line 10—10 in FIG. 4.
Figure 7:
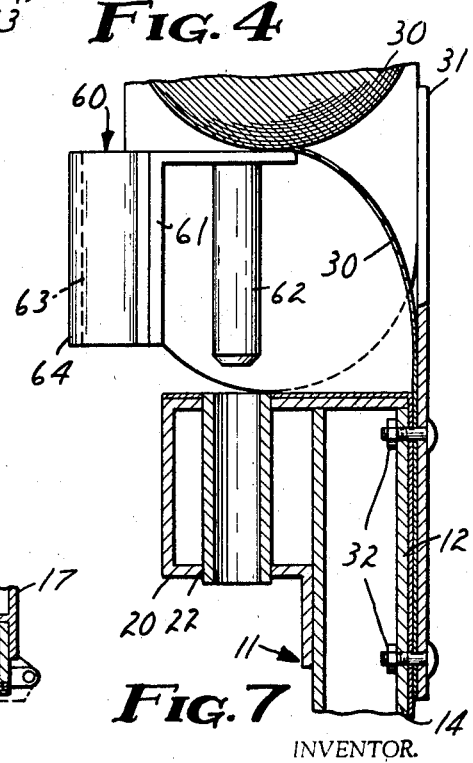
FIG. 7 is an enlarged detailed view illustrating the removal of the conversion frame with the flexible cover in the rolled position.

A plurality of short sections of rope 45 are fixed in grommets 46 adjacent the front edge of the flexible cover 30 and means 47 are provided in which the loose ends of the ropes 45 may be engaged to maintain the flexible cover 30 tautly in place over the cargo box 12. A second plurality of short lengths of rope 48 are fixedly attached to the flexible cover 30 in spaced apart relation along the street side thereof. The ropes 48 are attached to the flexible cover 30 by means of straps 49 which encircle the cylinder 35 and the loop of flexible material surrounding the cylinder 35, and are sewed at 36 with the loop of material. The straps 49 may be constructed from any suitable material such as leather, canvas, or the like. Means 50, similar to the means 47, are provided along the outer surface of the street side wall 15 to engage the free ends of each of the ropes 48 and maintain the flexible cover 30 tautly in position over the cargo box 12. A plurality of short flexible straps 51 are attached in spaced apart relation along the rear edge of the flexible cover 30 and adapted to engage a buckle attached adjacent the rear upper edge of the cargo box 12 above the doors 17 to maintain the rear edge of the flexible cover 30 tautly in position without interfering in the operation of the doors 17. The various means 47, 50 and the buckle arrangement along the rear edge of the cargo box 12 are not illustrated in detail because they do not form a portion of this invention, and any convenient means might be utilized. The cylinder 35 extends from adjacent the front wall 16 of the cargo box 12 to within a short distance of the rear of the cargo box 12, as illustrated in FIG. 10. The cylinder 35 is somewhat shorter than the cargo box 12 so that it does not interfere with the doors 17 being fully opened.

A small platform 55 having a ladder 56 depending therefrom is fixedly attached to the outer surface of the front wall 16 so that an operator can easily climb onto the platform 55 and manipulate the crank 40 to roll the flexible cover 30 into the rolled position against the bars 31 above the curb side wall 14. A single operator can move the flexible cover 30 into the rolled position or out of the rolled position very quickly and simply by rotating the crank 40 at the end of the cylinder 35. The operator has simply to engage the ropes 45 and 48 in the means 47 and 50, and buckle the straps 51 to secure the flexible cover 30 after the unrolling thereof, or disengage the ropes 45 and 48 and the straps 51 prior to rolling the flexible cover 30 into the rolled position. Thus, the entire operation can be performed by a single operator in a relatively short period of time.

Figure 5:
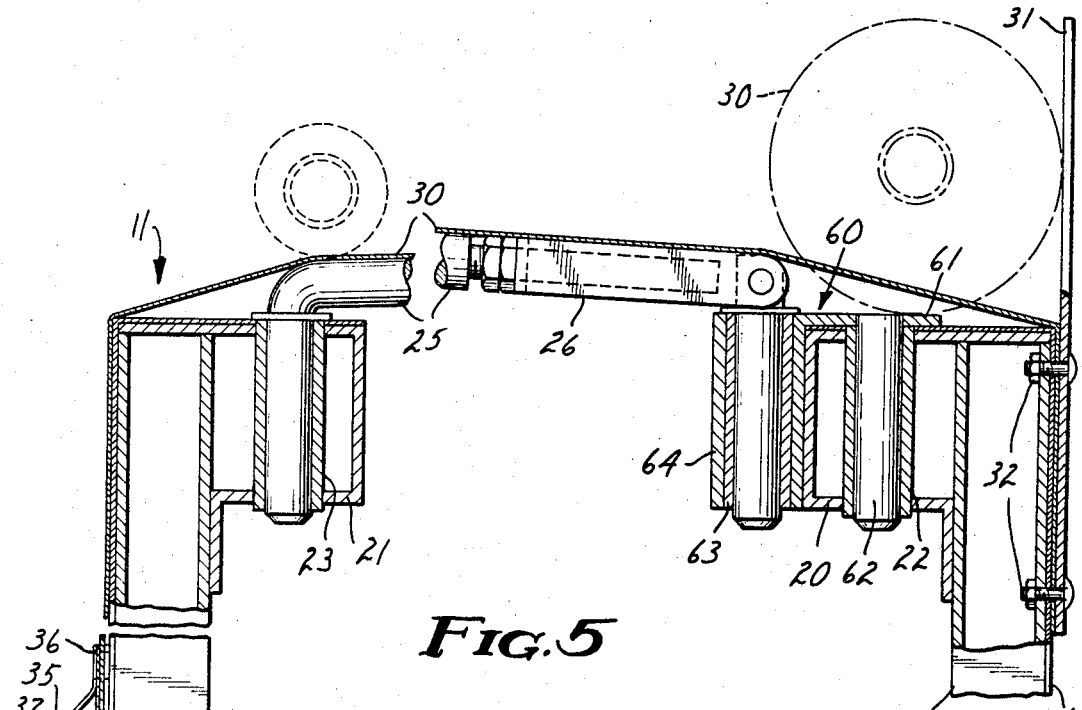
FIG. 5 is an enlarged sectional view as seen from the line 5—5 in FIG. 1, some parts broken away.
Figure 6:
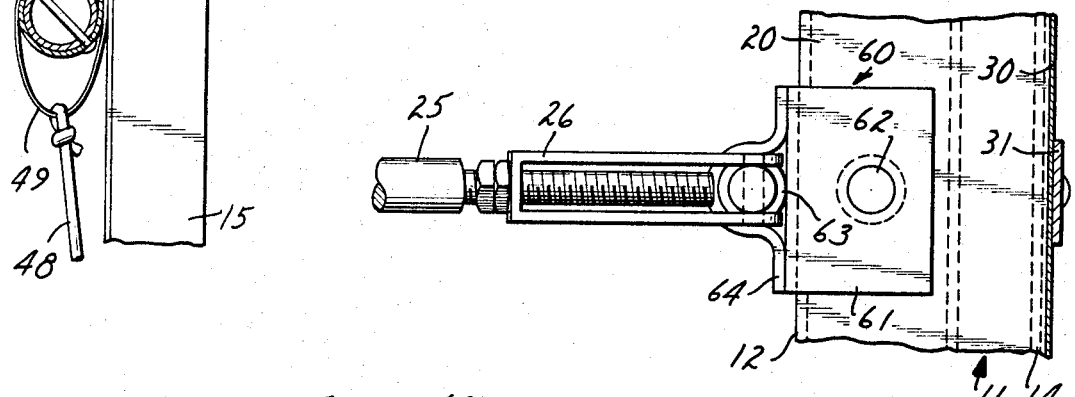
FIG. 6 is an enlarged detailed view illustrating the engagement of a conversion frame in the side wall of the cargo box, and the engagement of the bow in the conversion frame.
Figure 8:
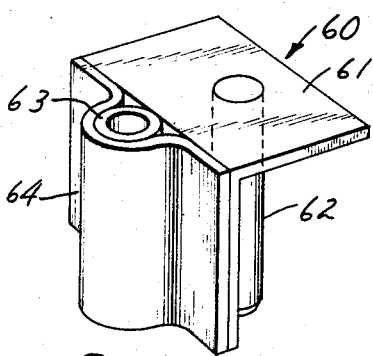
FIG. 8 is an enlarged view in perspective of a single conversion frame.

During loading or unloading operation of the cargo box 12, it is often necessary to move the flexible cover 30 into the rolled position, illustrated in dotted lines in FIG. 5, and remove the bows 25 from the sleeves 22 and 23 in the lips 20 and 21. It can be seen from FIG. 5 that the flexible cover 30 in the rolled position overlies the sleeves 22 in the lip 20 so that removal and replacement of the bows 25 in the sleeves 22 is extremely difficult or impossible. It should be noted that no semi-trailers are constructed at the present time with sufficient room between the sleeves 22 in the lip 20 and the outer surface of the curb side wall 14 to temporarily store the flexible cover 30 in the rolled position therebetween, however, it is anticipated that such construction may be common in the future, and it is fully intended that this construction be within the scope of this invention. In the present embodiment a plurality of conversion frames, generally designated 60, are utilized. Various views of the conversion frames 60 are illustrated in FIGS. 5 through 8. Each conversion frame 60 includes an angle-shaped bracket 61 having a pin 62 fixedly attached to the inner surface of one of the legs so that it is parallel and spaced from the other leg. The distance between the pin 62 and the parallel leg of the bracket 61 is approximately large enough so that the pin 62 can be engaged in the sleeve 22 and the inner surface of the bracket 61 butts against the outer surface of the lip 20. The outer diameter of the pin 62 is approximately equal to the outer diameter of the bows 25 so that it fits snugly into one of the sleeves 22. A hollow cylindrical member 63 having an inner diameter approximately equal to the inner diameter of the sleeve 22 is fixedly attached to the outer surface of the bracket 61 approximately parallel to the pin 62 by means of a generally U-shaped clamping member 64. The U-shaped clamping member 64 is fixedly attached to the cylinder 63 and the bracket 61 by some means, such as welding or the like, and serves to reinforce the cylinder 63 and the bracket 61. Thus, when the pin 62 is engaged in a sleeve 22, the cylinder 63 forms an opening spaced from the sleeve 22 a sufficient distance to allow one end of a bow 25 to be placed therein without interference from the flexible member 30 in the rolled position. The inner surface of the bracket 61 forms a shoulder that butts against the lip 20 to hold the cylinder 63 fixedly in the correct position. As previously explained, each of the bows 25 has a turnbuckle 26 therein so that the bow 25 may be shortened a sufficient distance to allow the end to be moved from the sleeve 22 into the cylinder 63. However, it should be noted that the bows 25 may be constructed from a single piece and preshortened to coincide with the cylinder 63 in the conversion frames 60. Thus, through use of the conversion frames 60, the flexible cover 30 may be temporarily stored in the rolled position adjacent the upper surface of the curb side wall 14 and against the bars 31 without interfering with the removal and replacement of the bows 25.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. A flexible cover assembly for an open topped semi-trailer having removable bows extending transversely thereacross comprising:
    (a) a generally rectangular flexible cover having one edge fixedly attached along one side of said semi-trailer and adapted to overlie the open top thereof;
    (b) an elongated cylinder fixedly attached to said flexible cover adjacent the edge thereof opposite and parallel to the edge attached to said semi-trailer;
    (c) a crank attached to one end of said elongated cylinder for manually rolling and unrolling said flexible cover around said elongated cylinder;
    (d) means extending upwardly approximately parallel with the vertical side of said semi-trailer and attached at the side of said semi-trailer having the flexible cover attached thereto for maintaining said flexible cover when in the rolled position in an overlying relationship at the top of said semi-trailer; and
    (e) a portion of said semi-trailer extending inwardly adjacent the upper end of said one side thereof and said portion having holes therein adapted to receive one end of said removable bows, said holes being spaced from said one side of said semi-trailer and said upwardly extending means a sufficient distance to allow said flexible cover in the rolled position to be temporarily stored therebetween.

2. A semi-trailer comprising:
    (a) an open topped cargo box including two vertical side walls with outside dimensions approximately equal to the maximum dimensions allowable on a highway, said box having wheels attached thereto for transportation thereof;
    (b) means attached adjacent the upper edges of each vertical side wall having a plurality of longitudinally spaced apart vertically oriented cylindrical openings therein;
    (c) a plurality of removable bows extending transversely across said cargo box with either end of each of said bows engaged in one of said holes in the vertical side walls;
    (d) a generally rectangular flexible cover fixedly attached adjacent one edge to the outer surface of one of the vertical side walls of said cargo box and adapted to overlie said bows to form a top wall of said cargo box;
    (e) an elongated cylinder fixedly attached to said flexible cover adjacent the edge thereof opposite and parallel to the edge attached to said cargo box;
    (f) a crank adapted to be attached to one end of said elongated cylinder for manually rolling said flexible cover around said cylinder into a rolled position and unrolling said flexible cover into an unrolled position overlying said bows;
    (g) means attached to the outer surface of said one vertical side wall and extending upwardly therefrom approximately parallel therewith for preventing said flexible cover in the roller position from protruding outwardly past the outer extremities of said one vertical side wall; and
    (h) said openings in the means attached adjacent the upper edge of said one vertical side wall being spaced inwardly from said upwardly extending means a sufficient distance to allow said flexible cover in the rolled position to be temporarily stored therebetween.

3. A semi-trailer as set forth in claim 2 wherein the means having the openings therein attached adjacent said one vertical side wall includes a vertically oriented cylindrical opening normally spaced from the upwardly extending means so that the flexible member in the rolled position overlies said openings and said means includes a plurality of frames each having a peg fixedly attached thereto and adapted to be engaged in one of said openings, each frame further having a hollow elongated cylinder adapted to receive one end of said bows therein fixedly attached to said frame axially parallel to said peg and spaced from said peg a distance sufficient to position the cylinder inwardly beyond said flexible member in the rolled position and a vertical shoulder positioned between said peg and said cylinder and adapted to butt against the inner surface of said one vertical side wall and maintain said cylinder in the correct position relative to a particular opening in said one side wall.

References Cited
UNITED STATES PATENTS 2,969,284  1/1961  Ambli _____ 296—100
2,976,082  3/1961  Dahlman _____ 296—98

BENJAMIN HERSH, *Primary Examiner.*

R. SONG, *Assistant Examiner.*